US 8,972,816 B2

(12) United States Patent
Ozturk et al.

(10) Patent No.: US 8,972,816 B2
(45) Date of Patent: Mar. 3, 2015

(54) SERVO GREY CODE ERROR CORRECTION

(75) Inventors: Mustafa Can Ozturk, Eden Prairie, MN (US); Puskal Prasad Pokharel, Edina, MN (US); Barmeshwar Vikramaditya, Eden Prairie, MN (US); Patrick John Korkowski, Bloomington, MN (US)

(73) Assignee: Seagate Technology LLC, Cupertino, CA (US)

( * ) Notice: Subject to any disclaimer, the term of this patent is extended or adjusted under 35 U.S.C. 154(b) by 350 days.

(21) Appl. No.: 13/427,490

(22) Filed: Mar. 22, 2012

(65) Prior Publication Data
US 2013/0250448 A1 Sep. 26, 2013

(51) Int. Cl.
*H03M 13/00* (2006.01)
*G06F 11/00* (2006.01)
*G08C 25/00* (2006.01)
*H04L 1/00* (2006.01)

(52) U.S. Cl.
USPC .......................................... 714/758; 714/799

(58) Field of Classification Search
CPC ........... G11B 20/18; G11B 2020/1282; G11B 20/1217; G11B 5/5965; G11B 5/59688; G11B 2020/10888
USPC ........ 714/758, 795, 799; 360/53, 48, 75, 77.8
See application file for complete search history.

(56) References Cited

U.S. PATENT DOCUMENTS

| | | | |
|---|---|---|---|
| 5,737,142 A | 4/1998 | Zook | |
| 5,949,358 A | 9/1999 | Volz | |
| 6,201,652 B1 | 3/2001 | Rezzi | |
| 6,298,459 B1 * | 10/2001 | Tsukamoto | 714/746 |
| 6,304,398 B1 | 10/2001 | Gauh | |
| 6,308,249 B1 | 10/2001 | Okazawa | |
| 6,653,956 B2 * | 11/2003 | Tsukamoto | 341/97 |
| 6,703,951 B2 * | 3/2004 | Tsukamoto | 341/120 |
| 7,369,343 B1 * | 5/2008 | Yeo et al. | 360/60 |
| 7,511,912 B2 | 3/2009 | Wilson | |
| 7,738,202 B1 * | 6/2010 | Zheng et al. | 360/46 |
| 8,693,123 B1 * | 4/2014 | Guo et al. | 360/49 |
| 2001/0043150 A1 * | 11/2001 | Tsukamoto | 341/97 |

* cited by examiner

*Primary Examiner* — Phung M Chung
(74) *Attorney, Agent, or Firm* — Cesari & Reed, LLP; Kirk A. Cesari; Christian W. Best

(57) ABSTRACT

The disclosure is related to systems and methods for servo Gray code error detection and correction. A device may include a circuit configured to 1) selectively implement a quality-based error correction system to determine an error in the servo Gray code and correct the error; 2) selectively implement a trajectory-based error correction system to determine an error in the servo Gray code and correct the error; or 3) implement any combination of a quality-based error correction system and a trajectory-based error correction system to determine an error in the servo Gray code and correct the error.

23 Claims, 5 Drawing Sheets

SERVO GREY CODE ERROR CORRECTION

BACKGROUND

Disc drive devices may include a data storage medium, such as a magnetic disc, and a head for reading data from or writing data to the disc. Servo data stored on the disc may be used to properly position the head over a particular area of the disc. Servo data on a disc may be divided into a number of fields, such as a preamble used for timing recovery, an address mark, sector ID to identify the current disc sector, track ID for coarse head positioning, position bursts that may contain fine head position information, and repeatable run out (RRO) fields. Often, one or more fields of servo data, especially track ID and sector ID, are encoded into Gray code (this may also be referred to as a Gray code field), which can minimize a number of bits that change between successive positions. However, errors in the Gray code may result in undesirable or sub-optimal performance of the disc drive device.

SUMMARY

The present disclosure relates to correcting errors in servo Gray code of a data storage device. In one embodiment, a device may comprise a circuit configured to assign a quality metric to each bit in a Gray code bit sequence, and change the value of a bit when the corresponding quality metric is low and a Gray code error is detected.

In another embodiment, a device may include a Gray code error correction module (GECM) adapted to determine which bits should not change between a first Gray code bit sequence and a second Gray code bit sequence. The GECM may then check to see if any of those bits changed in the second Gray code bit sequence, and switch the value of any improperly changed bits.

In yet another embodiment, a method may comprise assigning a quality rating to each bit in a Gray code bit sequence, and changing the value of any bit with a low quality rating when a Gray code error is detected.

Another embodiment may be a method comprising determining a set of bits that should not change between two Gray code bit sequences. The method may check to see if any bits in this set changed in the most recent Gray code bit sequence, and switch the value of any bits that did change.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Figure 1:
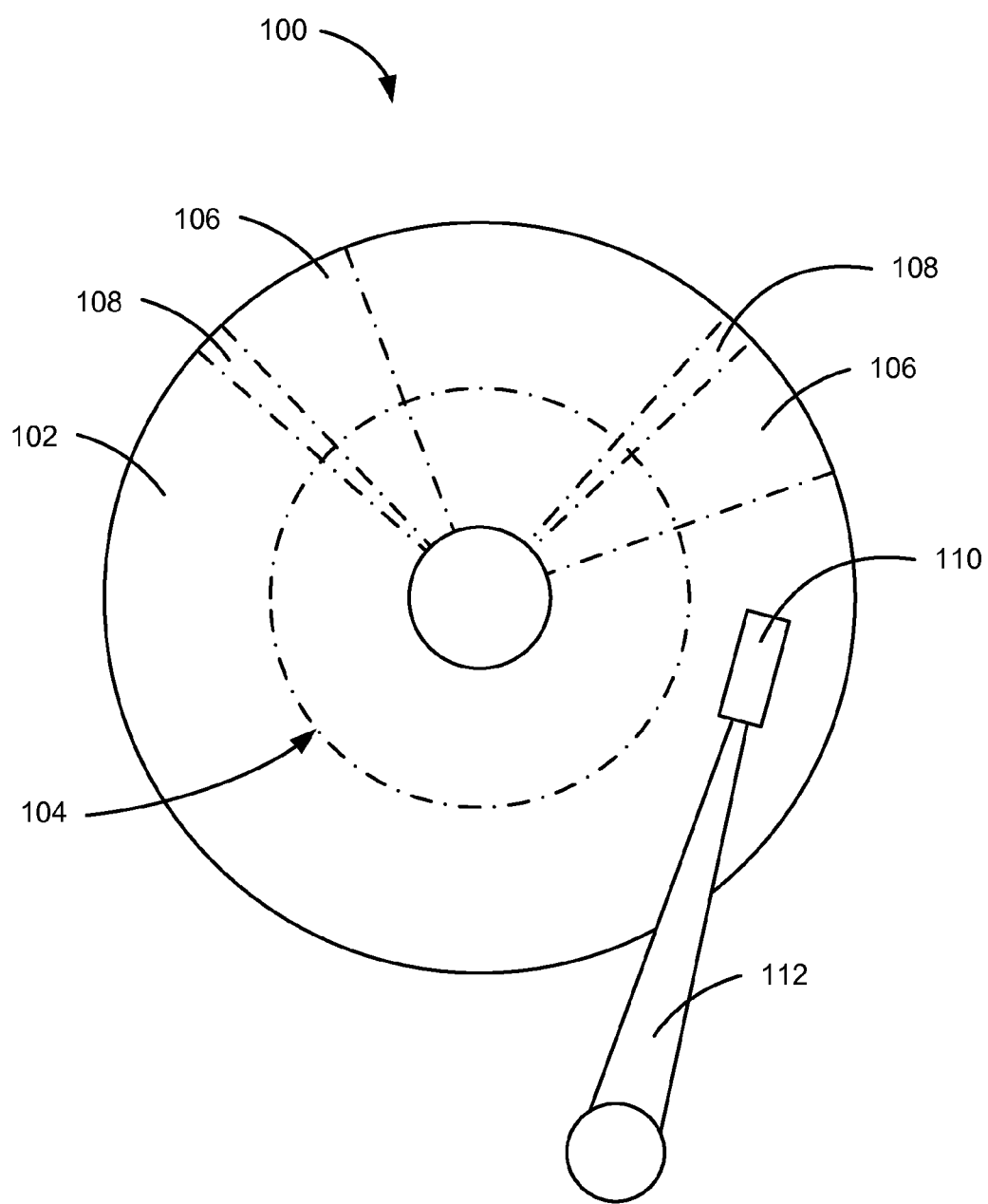
FIG. 1 is a diagram of an illustrative embodiment of a data disc and head assembly of a data storage device.

FIG. 1 is a diagram of an illustrative embodiment of a data disc, such as a magnetic disc or optical disc, and head assembly of a data storage device, generally designated 100. A rotatable data disc 102 can be used as a medium to store digital data. The disc 102 may be divided into a plurality of concentric circular tracks 104 that may store data. The tracks 104 may also be arranged on the disc 102 in a non-concentric pattern, such as in a spiral pattern. The disc 102 may be further divided into a plurality of wedge-shaped sectors 106. Specific data or locations on a disc 102 can be identified with a sector identification ("sector ID") or sector number, and a track identification ("track ID") or track address. This sector ID and track ID can be part of the servo data used to position an arm 112 having a read/write head 110 over the disc 102. A section 108 of each sector 106 may be devoted to store this servo data, while the remainder of the sector 106 may be used to store other data, such as user or system data. During operation, as the disc 102 spins, the head 110 can read the servo data 108 and use such data to move the arm 112 to position the head 110 over specific tracks 104. The data storage device may then read or write data to the disc 102 via the head 110.

During a seek operation, the head 110 may traverse the disc 102 at a high speed for positioning over a specific track 104. This can result in the head 110 reading a track ID partly from one track ID and partly from an adjacent track ID. Due to the nature of binary numbering systems, whereby multiple bits may change to advance from one number to the next successive number (e.g. 7=0111, while 8=1000), this may result in reading a track ID that is grossly different from the true track location of the head 110. As a simple example, the head may read the first two bits from track 7 (i.e. 01) and the last two bits from track 8 (i.e. 00), thereby reading a track ID of 4 (i.e. 0100) rather than its true position in the track 7 to 8 region.

For this reason, servo data can be encoded using a Gray code encoding scheme. Binary bit sequences encoded with a Gray code encoding scheme may change by 1 bit from one number to the next. By encoding servo data with a Gray code encoding scheme to produce servo Gray code, instances of the head 110 reading a grossly incorrect track ID can be reduced. However, servo Gray code errors may still arise, in the form of erroneous bit values being detected. Such errors can result in improper positioning of the head 110, in marking the sector 106 as an invalid target for write operations, or other detrimental operations for a data storage device.

The sector ID and track ID of the servo data 108 may be encoded with a Gray code encoding scheme individually and stored as individual elements in the servo data sector of a disc 108. Alternatively, the sector ID may be encoded into the track ID, either before or after the track ID is encoded with a Gray code encoding scheme, so that both data elements are included in a single bit sequence. In embodiments where the sector ID and track ID are stored as a single Gray code bit sequence, decoding the data may involve removing the sector ID data, then decoding the Gray code, or it may involve decoding the Gray code, then separating the sector ID from the track ID. Other variations are also possible. The method and order of encoding and decoding sector ID and track ID Gray code bit sequences may differ based on how a storage system is implemented.

Figure 2:
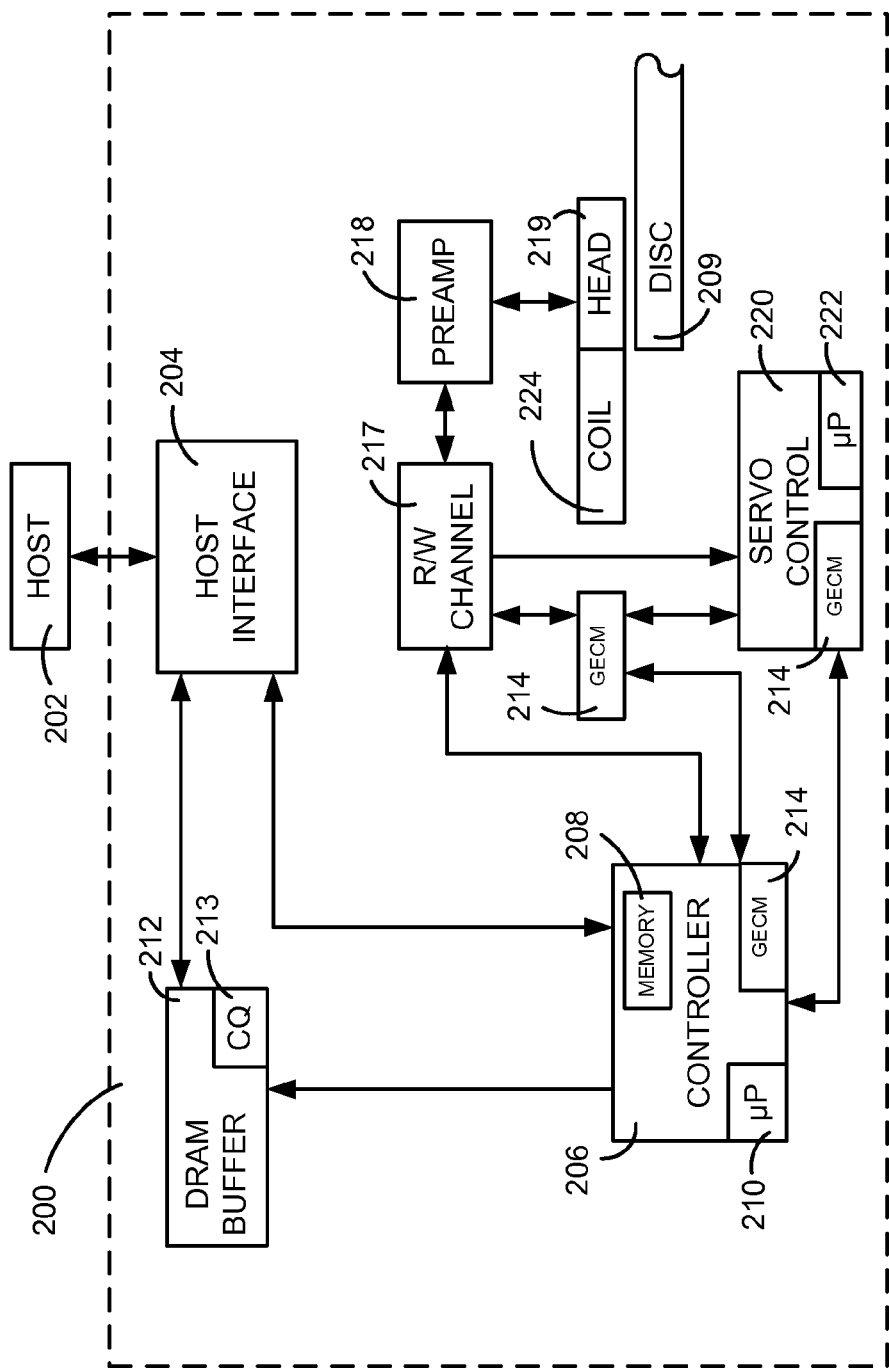
FIG. 2 is a diagram of an illustrative embodiment of a data storage device having a system for servo Gray code error correction.

FIG. 2 depicts a diagram of an illustrative embodiment of a system for servo Gray code error correction, generally designated 200. Specifically, FIG. 2 provides a functional block diagram of a data storage device (DSD). The DSD 200 can be a desktop computer, a laptop computer, a server, a personal digital assistant (PDA), a telephone, a music player, any other device which may be used to store or retrieve data, or any combination thereof. The DSD 200 can optionally connect to and be removable from a host device 202, which can similarly be a desktop computer, a laptop computer, a server, a personal digital assistant (PDA), a telephone, a music player, another electronic device, or any combination thereof. The data storage device 200 can communicate with the host device 202 via a hardware/firmware based host interface circuit 204 that may include a connector (not shown) that allows the DSD 200 to be physically removed from the host 202.

The DSD 200 can include a programmable controller 206 with associated memory 208 and processor 210. A buffer 212 can temporarily store user data during read and write operations and can include a command queue (CQ) 213 where multiple pending access operations can be temporarily stored pending execution. Further, FIG. 2 shows the DSD 200 can include a read/write (R/W) channel 217, which can encode data during write operations and reconstruct user data retrieved from disc(s) 209 during read operations. A preamplifier/driver circuit (preamp) 218 can apply write currents to the head(s) 219 and provides pre-amplification of readback signals. A servo control circuit 220 may use servo data to provide the appropriate current to the coil 224 to position the head(s) 219 over the disc(s) 209. The controller 206 can communicate with a processor 222 to move the head(s) 219 to the desired locations on the disc(s) 209 during execution of various pending commands in the command queue 213.

The DSD 200 may also include a Gray code error correction module (GECM) 214. The GECM 214 may be software, a programmable controller, a circuit, a CPU, or any combination thereof. The GECM 214 may be included in the controller 206, the servo control circuit 220, or it may be independent of other device elements. The GECM 214 may be adapted to identify and correct errors in Gray code in a number of ways.

The GECM 214 can detect when a Gray code error occurs on a disc based memory device; as described above, a format of a disc memory device may include tracks having Gray code regions that store encoded servo location information such as track identification or sector identification. One possible method to detect the occurrence of an error is by comparing the previous track ID location of the read/write head to the most recent Gray code-encoded track ID location data. The DSD 200 can be programmed to know how many tracks a head 110 is capable of traversing as it moves from one sector of a disc to the next; for example, the head 110 may move 8 tracks from sector 1 to sector 2. In another example, the DSD 200 may be programmed to know how many tracks the head 110 can traverse in a given time interval; for example, 8 tracks per millisecond. If the new Gray code data indicates that the head 110 has moved to a track beyond this threshold, a Gray code error has likely occurred. Sensors may be used to rule out mechanical causes of a sudden jump, such as shocks or bumps to the device. Once a Gray code error has been detected, the GECM 214 may attempt to correct erroneous bits so that the servo Gray code data may still be used for device operations.

One possible method for Gray code error correction is described herein as quality-based error correction (QBEC). Under QBEC, a quality metric or rating can be assigned to each bit in a Gray code bit sequence. The quality ratings can be assigned in a variety of ways. For example, a simple threshold detection based quality scheme may be available in some R/W channels 217, where the R/W channel 217 provides information regarding the quality (i.e. probability) of a bit being correct. Therefore, in some embodiments it may be advantageous to situate the GECM 214 between the R/W channel 217 and the controller 206 or the servo control 220, in order to receive bit quality values from the channel 217. Quality outputs for each bit can be derived from digital converter (ADC) or finite impulse response filter (FIR) samples corresponding to that bit, as well as other indicators of bit quality, such as ones obtained from a Viterbi algorithm.

A Gray code error correction module (GECM) employing QBEC may look for bits with a quality metric below a certain threshold. For example, FIR filter outputs for a given bit may range from −20 to 20, and bits with quality ratings between −5 and 5 may be classified as "low-quality" bits. Low quality bits are more likely to be a cause of Gray code errors, and by switching the value of these low-quality bits many Gray code errors can be corrected.

Figures 3, 4:
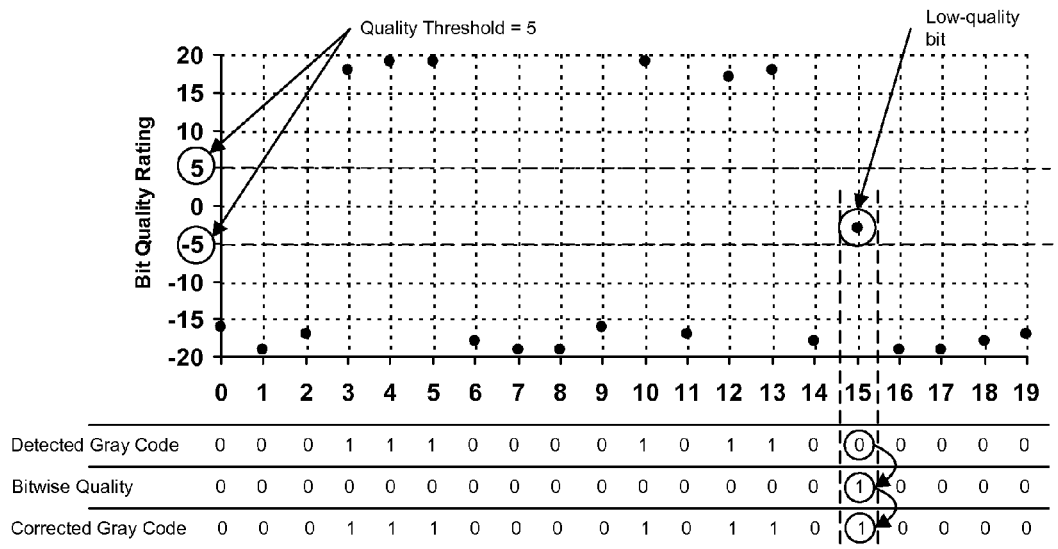
FIG. 3 is a graph illustrating an embodiment of a method for servo Gray code error correction.
FIG. 4 is a chart illustrating an embodiment of a method for servo Gray code error correction.

FIG. 3 is a graph illustrating an example of QBEC. In this example, a 20-bit Gray code sequence is detected, and each bit is assigned a quality rating from −20 to 20. The y-axis represents the possible bit qualities from −20 to 20, and the x-axis lists the bits from 0 to 19. Each bit is assigned a quality rating, represented by a point on the chart above that bit. Bits with quality ratings outside the −5 to 5 low-quality threshold are assigned a "bitwise quality" of 0 in the chart below the graph, indicating that such bits are not considered low-quality. In the FIG. 3 example, the only bit within the −5 to 5 low-quality threshold, and thus falls below the low-quality threshold, is bit 15 and it is assigned a bitwise quality of 1.

QBEC would determine which bit(s) have a bitwise quality of 1, which signifies they are a low-quality bit, and then flip the low-quality bit, in this case changing it from a 0 to a 1, as depicted in the "corrected Gray code" chart. The GECM may then check the new, corrected Gray code bit pattern to determine if a Gray code error still exists.

As an alternative to the low-threshold method, the GECM employing QBEC may arrange the bits based upon their respective quality metrics, ranking the bits from lowest quality to highest quality. Rather than switching all bits that fall below the quality threshold, or only switching the bits that fall below the threshold, a GECM may switch only the lowest-quality bit first and see if the error has been corrected. If the error has not been corrected, the next lowest-quality bit could also be switched. This process could be continued until the n-lowest quality bits have been changed. Alternatively, if switching the lowest quality bit did not correct the error, the next-lowest quality bit could be switched instead, and so on. This could address situations where the lowest-quality bit was not part of the error, but the second- or third-lowest quality bit was. In such situations, switching all low-quality bits, one after the other, may not correct the error.

Another possible method for Gray code error correction that may be employed by a Gray code error correction module (GECM) is trajectory-based error correction (TBEC). As previously discussed, binary bit sequences encoded with Gray code may change by only one bit between consecutive Gray code bit sequences. As also previously discussed, the head 110 can only move a set number of tracks within a given time interval or between adjacent sectors of the disc 102. By combining these two factors, it can be mathematically determined which bits in a Gray code bit sequence may change over a given time interval or between sectors, and which bits should not change. For example, if the GECM knows that the head 110 may move 8 tracks from one sector to the next, the GECM can determine which bits in a Gray code bit sequence may change when advancing the track ID by 8.

When a Gray code error is detected in a bit sequence, the bits in that bit sequence can be compared against the list of bits that should not have changed. If any improper bits changed since the previous Gray code bit sequence, those changed bits are likely to be the cause of the Gray code error and can be corrected.

FIG. 4 depicts a chart illustrating an embodiment of the TBEC method for servo Gray code error correction. The second column in FIG. 4 lists a series of detected Gray code bit sequences, which contain both track ID and sector ID information. In this particular embodiment, a track ID was encoded into Gray code, and a sector ID was then encoded into that same Gray code bit sequence. This encoding of the sector ID into the bit sequence may make it more difficult to determine which bits in the bit sequence may change and which bits should not change. Therefore, after the detected Gray code sequence is read, the sector ID information can be removed to simplify the TBEC process.

If a Gray code error is detected, a GECM employing TBEC may determine which bits should not have changed from the previously read Gray code bit sequence. This can be based on how far the read/write head 110 is expected to travel during a given time interval or between sectors. Because Gray code bit sequences may change by only one bit from one number to the next, it can be mathematically determined which bits may change based on how far the head 110 may move. For example, if the head 110 may move 8 tracks, TBEC may determine that only the 3 least-significant bits may change from one Gray code sequence to the next read Gray code sequence. If any bits besides those 3 least-significant bits were to change, those changed bits may be changed back in an attempt to correct the Gray code error.

The fourth column of FIG. 4, designated "Gray code (sector ID removed)," contains a number of 19-bit Gray code bit sequences. Using TBEC, the GECM can determine that the 16 most-significant bits should not change based on the head 110 speed, and the 3 least-significant bits may change. In this example, while moving from sector 2 to sector 3, a Gray code error would be detected. Having determined that the 16 most-significant bits should not change between these bit sequences, the GECM can compare the 16 most-significant bits from sector 2 to the 16 most significant bits from sector 3 to determine if any of them have changed. In this manner, the erroneous bit may be detected and its value switched. The GECM may then check if this switch corrected the Gray code error.

The head 110 may travel at different speeds depending on the operating mode of the disc-based storage device 200; for example, seeking, track following, etc. Therefore the GECM may be adapted to adjust the correctible bits based on the current operating mode of the device 200.

The GECM may use other methods to estimate which bits should not change between Gray code bit sequences. In some embodiments, information from multiple previous sectors may be used to predict the next Gray code bit sequence. As an example, the GECM may be adapted to note which bits have not changed between a previous number of Gray code bit sequences; e.g., which bits have not changed in the past four Gray code bit sequences. This group of unchanging bits is likely not to change in the next Gray code bit sequence either. If a Gray code error is detected in the next bit sequence, the bits of that sequence could be modified to match the unchanging bits from the prior sequences. Other methods may involve noting how far the head has moved between previous sectors and using this information to predict where the head should be located next, or measuring the current velocity of the head to predict where the head should be and a corresponding Gray code bit sequence for that location. Another method may be to use the target location to which the head is supposed to move to predict what the Gray code bit sequence should be for that location, and comparing that information to the read Gray code bit sequence. When the GECM has a predicted or expected Gray code bit sequence, some degree of tolerance could be set for allowable differences for the read bit sequence. Bits that are different outside of that tolerance could be switched if a Gray code error is detected.

TBEC determines which bits should not change between Gray code bit sequences. When a new Gray code bit sequence is read and a Gray code error is detected, the list of bits that should not change from the new Gray code is compared against the corresponding bits from another bit sequence. As may be apparent from the described embodiments, the Gray code bit sequence used for comparison may be a previously read Gray code bit sequence, or it may be a Gray code bit sequence corresponding to a predicted destination or target location for the read/write head. These predicted or estimated Gray code bit sequences can be derived from various methods, as the described examples illustrate.

Figure 5:
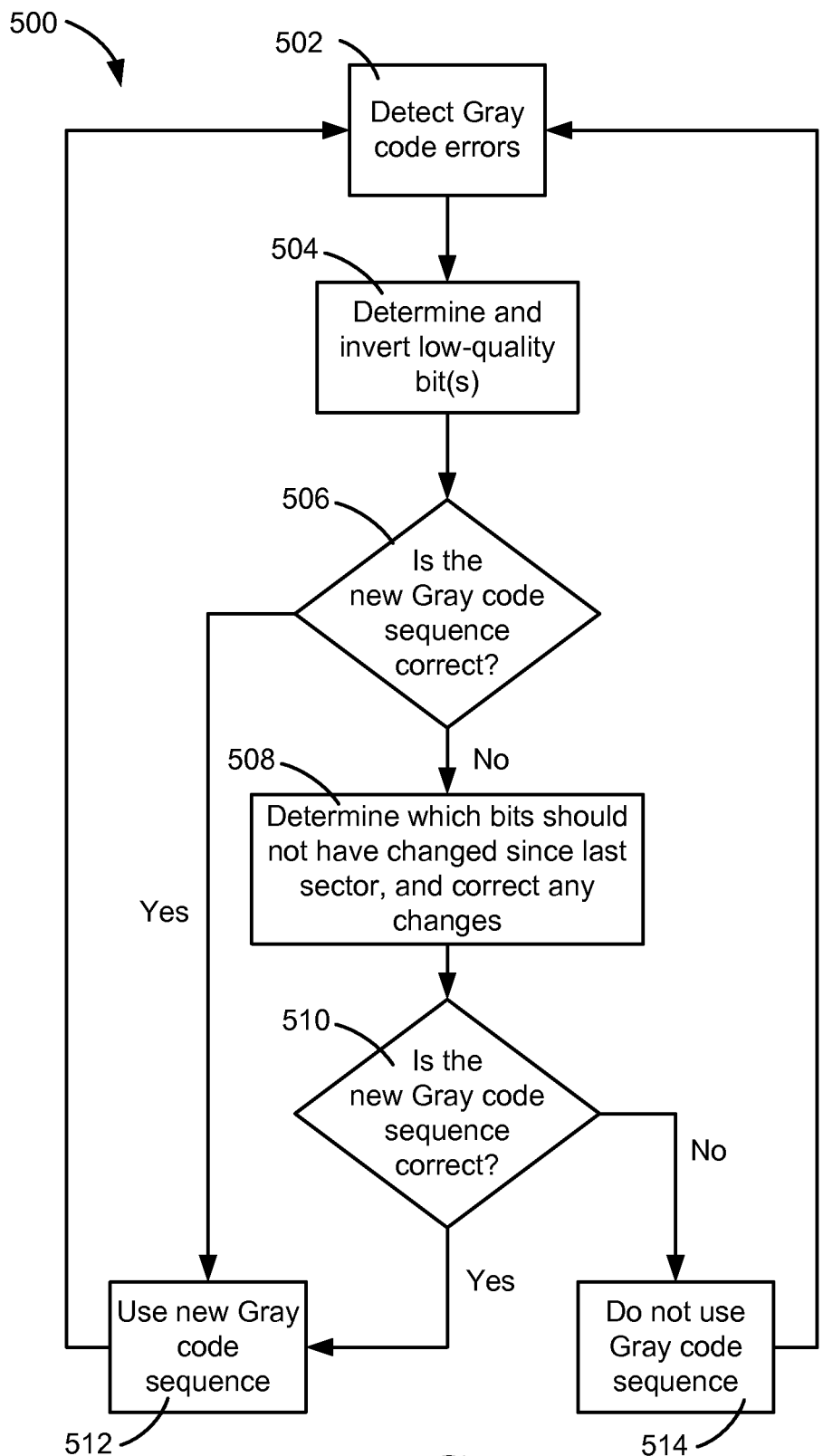
FIG. 5 is a flowchart of an illustrative embodiment of a method for servo Gray code error correction.

Both quality-based error correction (QBEC) and trajectory-based error correction (TBEC) methods can be implemented together to increase the likelihood of correcting a Gray code error. FIG. 5 is a flowchart of an illustrative embodiment of a method 500 for servo Gray code error correction employing both methods. This method 500 may be implemented by a disc-based data storage device (DSD) to correct servo Gray code errors and improve device performance.

The method 500 may involve detecting Gray code errors, at 502. As discussed, a possible method to detect the occurrence of an error is when the servo Gray code data indicates that the read/write head 110 may have moved too far in a given time interval. The DSD can be programmed to know how far a head 110 is capable of traveling in a given time interval or between sectors of the disc; for example, 8 tracks per sector. If the new Gray code data indicates that the head 110 has moved more than 8 tracks between sectors, a Gray code error has likely occurred. Sensors may be used to rule out mechanical causes of the sudden jump, such as shocks or bumps to the device.

Once a servo Gray code error has been detected, the method 500 may employ quality based error correction (QBEC) to determine and invert low-quality bits, and/or trajectory-based error correction (TBEC) to determine which bits in the Gray code sequence should not have changed from the previous Gray code data and invert bits that improperly changed, at 504. The method 500 may involve using only one of QBEC or TBEC, or it may involve using both error correction methods. In embodiments where both methods are used, the two correction methods may be used in sequence (i.e. using one method, followed by using the other method), or in parallel (e.g., employing both methods and comparing the results of each to determine which bits to change).

After employing one or both of QBEC and TBEC, the method 500 may involve checking if the new adjusted Gray code bit sequence is correct, at 506. If so, the corrected Gray code sequence can be used for DSD operation, at 508. If the Gray code sequence was not corrected, it should not be used for device operations, at 510.

As noted above, the method 500 could involve performing the QBEC and TBEC correction methods in sequence or in parallel. In an example embodiment of the method performing the correction methods in sequence, the method may involve performing QBEC followed by TBEC. In this embodiment, a Gray code error is detected as described at 502.

Next, the method may employ quality based error correction (QBEC) to determine and invert low-quality bits. As discussed for QBEC, this may include inverting bits with a quality metric below a certain threshold, or it may include sorting the bits based on quality value and inverting the lowest-quality bit(s).

After employing QBEC, the method may involve checking if the QBEC was successful and the adjusted Gray code sequence is correct. If so, the corrected Gray code sequence can be used for DSD operation.

Of the adjusted Gray code sequence is not correct, the example method may next employ trajectory-based error correction (TBEC). As discussed, TBEC may involve determining which bits in the Gray code sequence should not have changed from the previous Gray code data. This determination may involve mathematically determining which bits may change based on the device operation and the speed of the read/write head, or it may involve a comparison to which bits have not changed from prior Gray code sequences. Once a determination is made on which bits should not have changed, those bits in the current Gray code sequence may be compared to those bits in the prior Gray code sequence. If any of those bits have changed, those bits should be inverted.

After employing TBEC, the method may involve checking if the TBEC was successful and if the adjusted Gray code sequence is correct. If so, the corrected Gray code sequence can be used for DSD operation. If the Gray code sequence was not corrected, it should not be used for device operations.

It should be noted that the method depicted in FIG. 5 and the example method performed in sequence are just some examples, and many modifications and permutations may be apparent to one skilled in the art. As an example, if the first error correction method performed in sequence does not correct the error, the method may discard the suggested changes, or it may keep the suggested changes before attempting the second error correction method. Alternately, both error correction methods could be attempted individually, and if neither corrected the error, the suggested changes from both methods could be combined to determine if that resolves the error.

In another possible modification of the method 500, the QBEC and TBEC could be performed in a different order, such as TBEC being performed first and QBEC being performed second. Another option is to perform both correction methods simultaneously (i.e. in parallel), and to compare the likely erroneous bits determined under both methods. If both methods determine that a particular bit is a likely error bit, there is a high probability that changing that bit will correct the error. This may also reduce the likelihood of changing a bit that was not, in fact, the erroneous bit, due to a false positive in one of the error correction methods.

Figure 6:
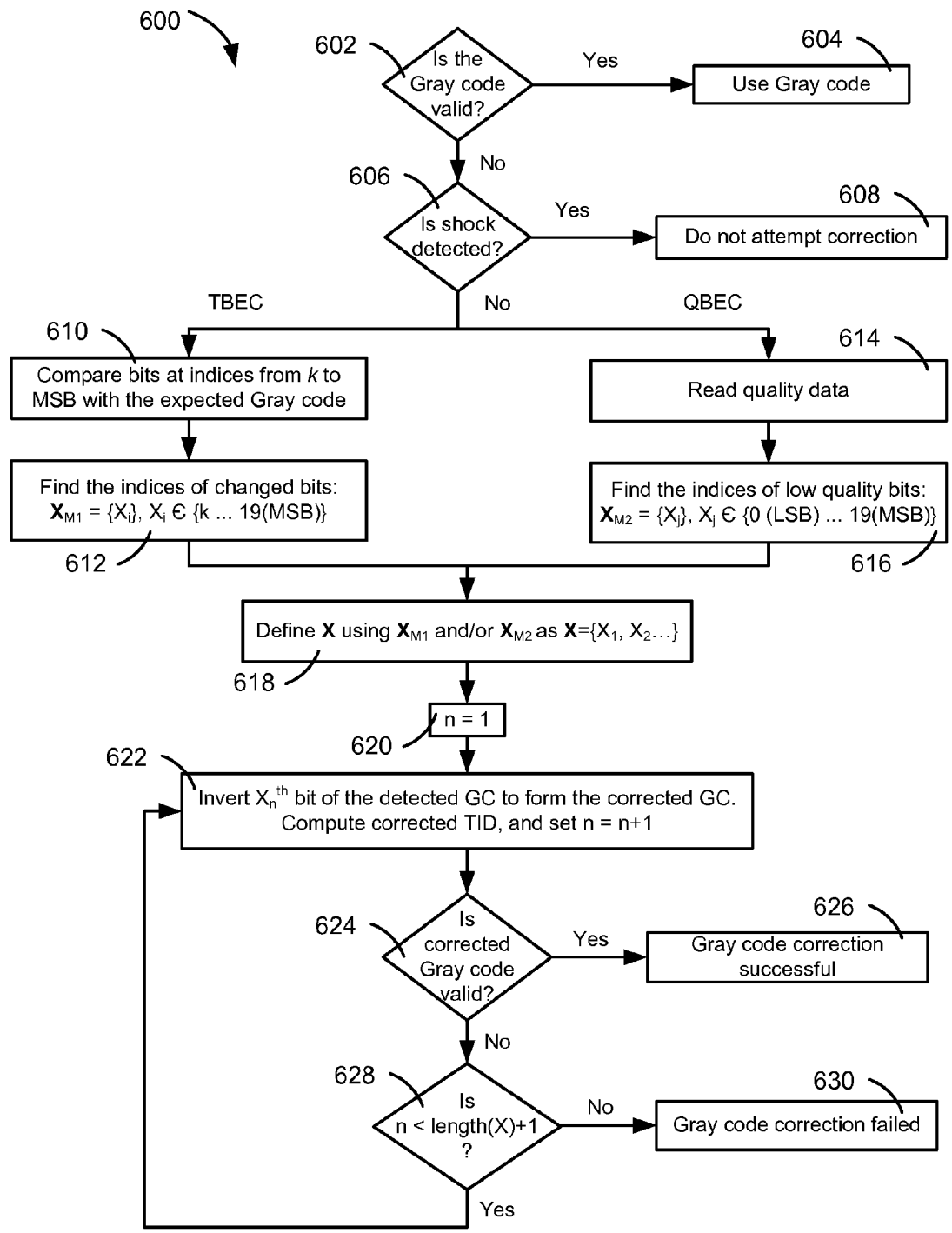
FIG. 6 is a flowchart of an illustrative embodiment of a method for servo Gray code error correction.

FIG. 6 is a flowchart of another illustrative embodiment of a method 600 for servo Gray code error correction employing both trajectory-based error correction (TBEC) and quality-based error correction (QBEC). The method may involve determining if the detected Gray code is valid, at 602. If there is no error, the Gray code may be used as normal, at 604. If an error is detected, the method may involve determining if a physical shock or other external interference may have caused the error, at 606. If a shock was detected, the method may not attempt to correct the Gray code error, at 608. If no shock or external interference was detected, the method may employ one or both TBEC and QBEC in order to attempt to correct the error.

The method 600 employing TBEC may compare a first Gray code bit sequence with a second Gray code bit sequence, at 610. The first Gray code may be a previously read correct Gray code, or it may be an estimated or anticipated Gray code bit sequence corresponding to where a head in a data storage device will be located. The second Gray code may be the bit sequence that was actually read and which contains a Gray code error. Specifically, a method employing TBEC may determine which bits should not change between the first Gray code bit sequence and the second Gray code bit sequence. For example, in 20-bit Gray code bit sequences with bit positions numbered from 0 to 19, with 19 being the most-significant bit (MSB), the method may determine that no bits from position k to MSB should change, while any bits from position 0 to k−1 may change.

The method 600 may create a list of the Gray code bit indices that improperly changed between the first Gray code bit sequence and the second Gray code bit sequence, at 612. As depicted in FIG. 6, the list of improperly changed bits designated $X_{M1}$ contains the elements $X_i$, where $X_i$ are the indices of improperly changed bits between between k and 19 (MSB). These bits at these indices may be a likely cause of the Gray code error detected in the second Gray code bit sequence.

The method 600 employing QBEC may obtain a quality value for each bit of the read Gray code bit sequence, at 614. The method 600 may then create a list containing the indices of the low-quality bits. As depicted in FIG. 6, the list designated $X_{M2}$ may contain the elements $X_j$, where $X_j$ are the indices of the low quality bits of the read Gray code bit sequence between positions 0 and 19 (MSB). These low-quality bits may be a likely cause of Gray code errors in the read Gray code bit sequence.

The method 600 can then create a list of bit indices with bits that are a likely cause of the Gray code error, at 618. If the method 600 uses only one of TBEC or QBEC, the list X may contain either the elements of $X_{M1}$ or $X_{M2}$ from steps 612 or 616. If the method uses both TBEC and QBEC, the list X may contain the elements of both $X_{M1}$ and $X_{M2}$. These examples are merely illustrative, and if other methods of error correction are employed, detected errors could similarly be added to the list.

Once a list of probable errors is assembled at 618, the method 600 may attempt correction of the Gray code error by going through the list, using "n" as a counter and setting it at 1 to start at the beginning of the list, at 620. The method 600 may then invert the $X_n^{th}$ bit in the read Gray code bit sequence, compute the adjusted values for the Gray code-encoded servo data, and set n to n+1, at 622.

The method 600 may check if inverting the bit corrected the Gray code error, at 624. If the error is corrected, the method may terminate at 626. If the error was not corrected, the method could check if it has reached the end of the list of potential error bits, at 628, by checking if the value of n is now greater than the length of the list. If the end of the list has been reached, the method may terminate, at 630. If the end of the list has not been reached, the method may attempt to correct the next bit in the list and increment the value of n, at 622.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
    a circuit configured to:
       employ a quality-based error correction technique, including:
          determine an error in servo data, which includes servo Gray code encoded via a Gray code encoding scheme, by analyzing quality metrics of bits in the servo Gray code; and
          modify the servo Gray code based on the error.

2. The device of claim 1, the quality-based error correction technique further comprising the circuit configured to:
    assign a quality metric to each bit in a Gray code bit sequence; and
    change a value of a bit when a corresponding quality metric is determined to signify an erroneous bit.

3. The device of claim 2 wherein the quality metric for each bit is determined by samples from a finite impulse response filter (FIR).

4. The device of claim 2 wherein the quality metric for each bit is determined by samples from a digital converter (ADC).

5. The device of claim 2 wherein the circuit is configured to change the value of the bit when the corresponding quality metric is lower than a threshold.

6. The device of claim 2 wherein the circuit is further configured to:
    sort each bit in the Gray code bit sequence by the quality metric for each bit; and
    change a value of a bit with a lowest quality metric.

7. The device of claim 6 wherein the circuit is further configured to:
    change a value of a bit with the lowest quality metric;
    change the value of a bit with a next-lowest quality metric when an error is still detected in the Gray code bit sequence.

8. The device of claim 7 wherein the circuit is further configured to:
    repeat changing the value of a bit with a successively next-lowest quality metric after a previous lowest quality bit has been changed and an error is still detected in the Gray code bit sequence.

9. The device of claim 1 wherein the circuit is further configured to:
    select between the quality-based error correction technique and a trajectory-based error correction technique to determine to the error and modify the servo Gray code, the trajectory-based error-correction technique including:
       determine a group of bits that should not change between a first Gray code bit sequence and a second Gray code bit sequence;
       compare the group of bits that should not change in the first Gray code bit sequence to the group of bits that should not change in the second Gray code bit sequence to identify at least one changed bit in the group of bits that should not change; and
       switch a value of an identified changed bit from the group of bits that should not change in the second Gray code bit sequence.

10. The device of claim 9 wherein the group of bits that should not change is determined based upon a measure of distance a read/write head can traverse in a discrete time interval.

11. The device of claim 10 wherein the measure of distance the read/write head can traverse changes based upon an operating mode of the device.

12. The device of claim 9 wherein the group of bits that should not change is determined based upon a set of bits that have not changed in a number of prior Gray code bit sequences.

13. The device of claim 9 wherein the group of bits that should not change is determined based upon a method selected from a group consisting of measuring a velocity for a read/write head and determining a target location and a corresponding Gray code bit sequence for the read/write head based upon the velocity, calculating a target Gray code bit sequence to use as the first Gray code bit sequence, and noting a distance a read/write head has moved between a discrete number of previous sectors and using the distance to predict a current Gray code bit sequence to use as the first Gray code bit sequence.

14. The device of claim 9 wherein the circuit is further adapted to:
    assign a quality metric to each bit in the second Gray code bit sequence; and
    change a value of a bit when a corresponding quality metric is identified as possibly erroneous.

15. The device of claim 14 wherein the circuit is further adapted to:
    compare a set of bits with a low quality metrics to a set of changed bits from the group of bits that should not change in the second Gray code bit sequence; and
    change the value of a bit that is included in both the set of bits with a low quality metric and the set of changed bits from the group of bits that should not change.

16. A method comprising:
    selectively implementing a trajectory-based error correction system, including:
       determining an error in servo data that is encoded using a Gray code encoding scheme to produce servo Gray code by evaluating a set of bits in the servo Gray code that should not change; and
       modifying the servo Gray code based on the error.

17. The method of claim 16 further comprising:
    selecting between implementing the trajectory-based error correction system and implementing a quality-based error correction system to determine the error and modify the servo Gray code, the quality-based error correction system including analyzing quality metrics of bits in the servo Gray code.

18. The method of claim 17 wherein the quality-based error correction system comprises:
    assigning a quality rating to each bit in a first Gray code bit sequence; and
    switch the value of a bit when a corresponding quality rating is determined to signify an erroneous bit.

19. The device of claim 17 wherein the quality-based error correction system comprises:
    sorting each bit in the Gray code bit sequence by a quality metric for each bit; and changing a value of a bit with a lowest quality metric of each bit in the Gray code bit sequence.

20. The method of claim 16 wherein the trajectory-based error correction system further comprises:
determining a group of bits that should not change between a first Gray code bit sequence and a second Gray code bit sequence;
switching a value of a changed bit from the group of bits that should not change in the second Gray code bit sequence.

21. A device comprising:
a circuit adapted to implement a combination of a quality-based error correction system and a trajectory-based error correction system to:
determine an error in servo data that is encoded using a Gray code encoding scheme to produce servo Gray code; and
modify the servo Gray code based on the error.

22. The device of claim 21 wherein the quality-based error correction system comprises a circuit adapted to:
assign a quality rating to each bit in a first Gray code bit sequence; and
switch the value of a bit based on a corresponding quality rating that is determined to signify an erroneous bit.

23. The device of claim 22 wherein the trajectory-based error correction system further comprises a circuit adapted to:
determine a group of bits that should not change between a first Gray code bit sequence and a second Gray code bit sequence;
switch a value of a changed bit from the group of bits that should not change in the second Gray code bit sequence.

* * * * *